Figure 1:
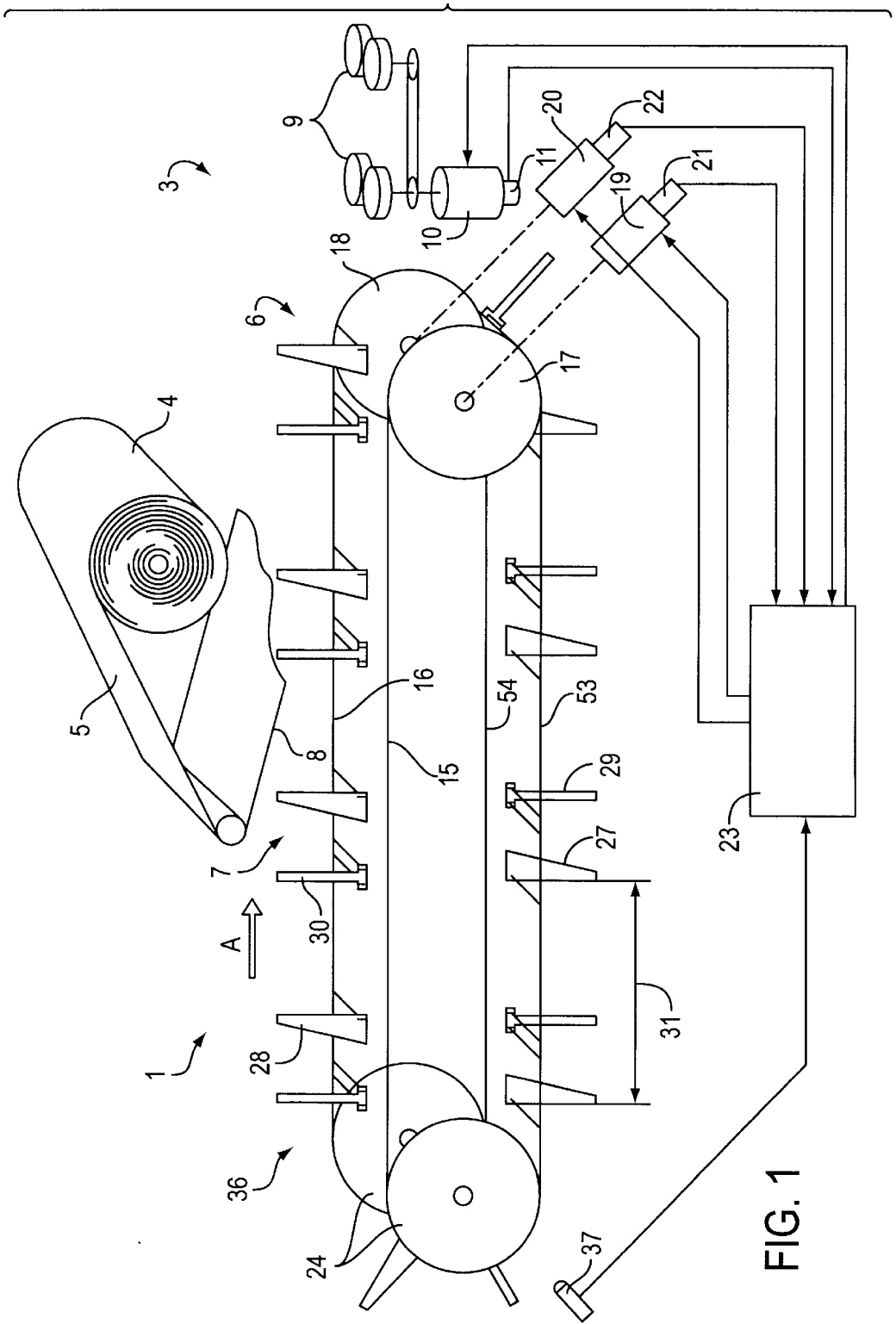

United States Patent [19]
Looser et al.

[11] Patent Number: 6,024,207
[45] Date of Patent: Feb. 15, 2000

[54] FEED DEVICE FOR A PACKAGING MACHINE

[75] Inventors: Walter Looser, Waltalingen; René Fluck, Schleitheim, both of Switzerland

[73] Assignee: SIG Schweizerische Industrie–Gesellschaft, Neuhausen am Rheinfall, Switzerland

[21] Appl. No.: 08/945,443
[22] PCT Filed: Jun. 12, 1996
[86] PCT No.: PCT/CH96/00225
§ 371 Date: Oct. 27, 1997
§ 102(e) Date: Oct. 27, 1997
[87] PCT Pub. No.: WO96/41760
PCT Pub. Date: Dec. 27, 1996

[30] Foreign Application Priority Data

Jun. 13, 1995 [CH] Switzerland ............................. 1741/95

[51] Int. Cl.$^7$ ........................... B65G 29/00; B65G 15/44; B65G 37/00
[52] U.S. Cl. ................. 198/473.1; 198/570; 198/867.08; 198/484.1
[58] Field of Search ............................. 198/570 C, 473.1, 198/484.1, 803.1, 803.13, 867.08 C, 570, 867.08

[56] References Cited

U.S. PATENT DOCUMENTS

| | | |
|---|---|---|
| 4,068,756 | 1/1978 | Loewenthal . |
| 4,180,154 | 12/1979 | Anderson ............................. 198/470 X |
| 4,768,642 | 9/1988 | Hunter ................................. 198/570 X |
| 5,127,209 | 7/1992 | Hunter ................................. 198/570 X |
| 5,337,887 | 8/1994 | Greenwell et al. ............ 198/803.13 X |
| 5,560,473 | 10/1996 | Ivansco, Jr. et al. .......... 198/803.13 X |

FOREIGN PATENT DOCUMENTS

| | | |
|---|---|---|
| 0399948 | 11/1990 | European Pat. Off. . |
| 1393472 | 2/1965 | France . |
| 2391126 | 12/1978 | France . |
| 412708 | 11/1966 | Switzerland . |
| 1060219 | 3/1967 | United Kingdom . |

*Primary Examiner*—William E. Terrell
*Assistant Examiner*—Kenneth Bower
*Attorney, Agent, or Firm*—Venable; Gabor J. Kelemen

[57] ABSTRACT

A feed device for a packaging machine having two conveying elements that circulate adjacent to one another at least along an operating path between a loading station and an unloading station. The conveying elements are driven by separate drive motors each connected to a respective rotation angle sensor. The motors and sensors are connected to a control device. Each conveying element has a plurality of pushers spaced with a uniform, settable interval, the plurality of pushers extending over only a portion of the length of the respective conveying element and including a front pusher and back pusher. The control device control the device motors in such a manner that the front pusher of the one conveying element, in the region of the loading station, follows the back pusher of other conveying element with a spacing corresponding to the interval.

10 Claims, 3 Drawing Sheets

FEED DEVICE FOR A PACKAGING MACHINE

Feed devices for a packaging machine are known from CH-A-412 708 (and its counterpart GB 1.060.219) or U.S. Pat. No. 4,068,756, which are incorporated as inherent components into the present application. Pushers spaced at uniform intervals are carried along by an endless, circulating chain. In the solution according to U.S. Pat. No. 4,068,756, pins onto which the pushers are inserted project laterally from each link of the chain. The interval can be changed through rearrangement of the inserted pushers. The length of the circulation path of the pushers must be a whole-number multiple of the interval. To achieve this, a loop used as a bypass for the pushers is formed at the lower run of the chain. The upstream deflection wheel of the chain can be adjusted in the conveying direction.

It is the object of the present invention to configure a conveying device of the type mentioned at the outset to be simpler than the solutions described above. This object is accomplished by the combination of the features of the claims.

Figure 2:
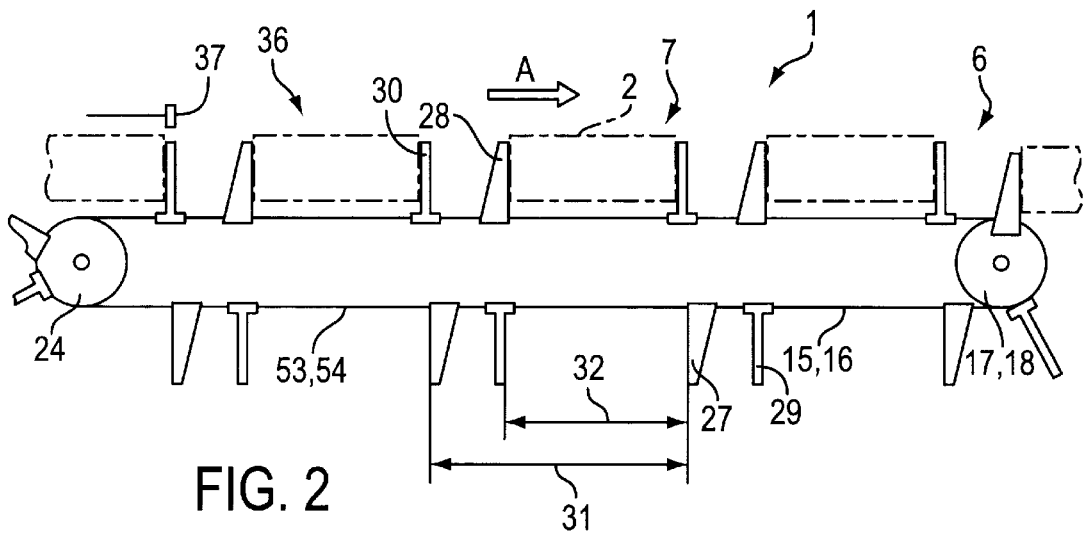
Figure 3:
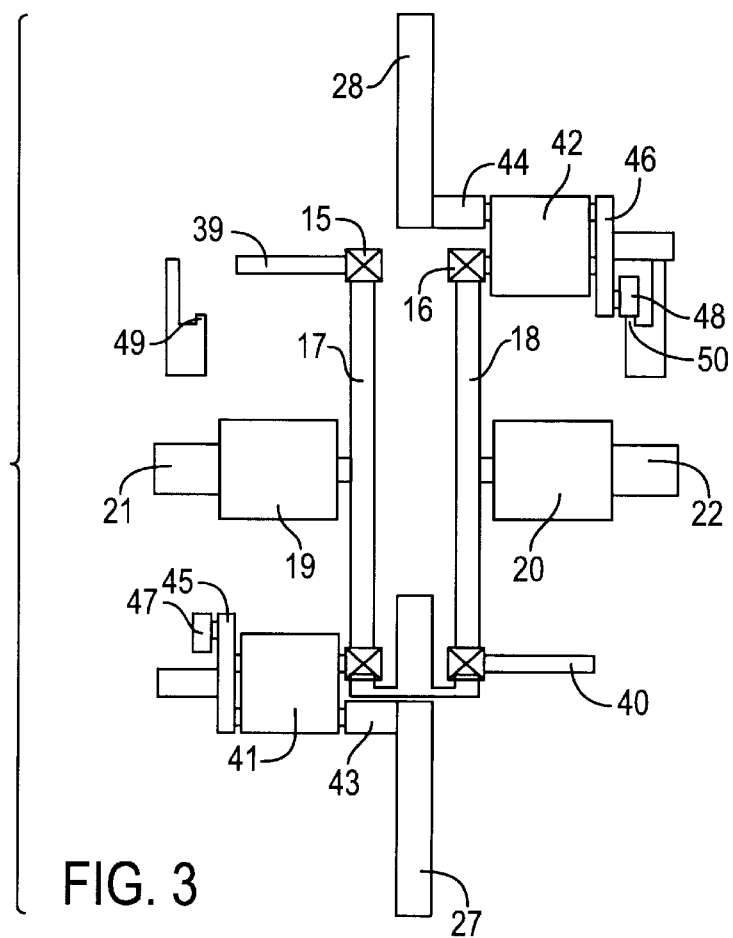
Figure 4:
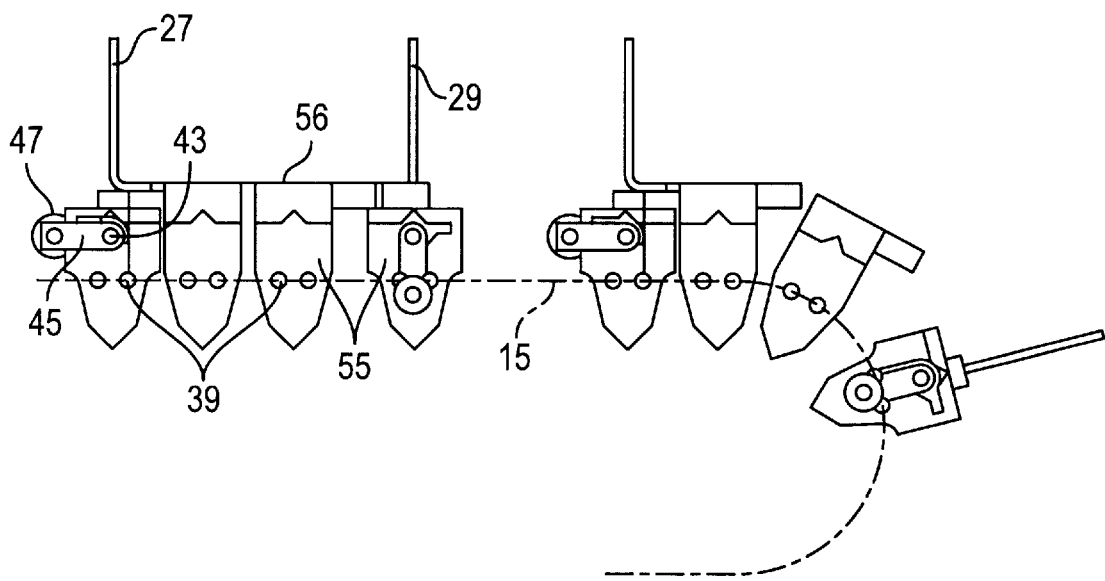
Figure 5:
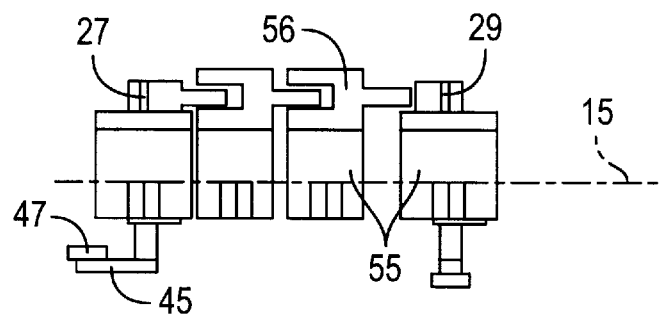

An embodiment of the invention is described below in conjunction with the drawings. Shown are in:

FIG. 1 a schematic view in perspective of the device,
FIG. 2 a schematic side view,
FIG. 3 a cross-section,
FIG. 4 a detailed side view of a part of the device, and
FIGS. 4 and 5 plan views of a cutout.

The conveying device 1 shown schematically in FIG. 1 serves to feed products 2 (FIG. 2), for example groups of biscuits positioned on end, to a packaging machine 3, only indicated. The packaging machine can be a bag-forming, -filling and -sealing machine, for example according to EP-B-399 948, whose contents are explained as an integrated component of the present application. The packaging machine 3 has a supply roll 4 of wrapping-material film 5. At the downstream end, the products are wrapped with the film 5 at the end station 6 of the operating path 7 of the device 1. In the conveying direction A, downstream of the end station 6, the longitudinal edges 8 of the film 5 are sealed together by sealing and transport wheels 9, forming a loop around the products 2, which are spaced from one another. The wheels 9 are driven by a motor 10. The motor 10 is connected to a rotation-angle setter 11. Downstream of the wheels 9, the final sealing and separation into individual packages is effected with transverse sealing jaws equipped with separating blades.

The device 1 includes two parallel conveying chains 15, 16. At the end station 6, the chains 15, 16 are guided around two coaxial chain wheels 17, 18 of equal size. The wheels 17, 18 are driven by separate servo motors 19, 20, which each have an incremental rotation-angle setter 21, 22. The setters 21, 22 are connected to a control device 23 that controls the motors 19, 20 with respect to rpm and angle of rotation, as well as the motor 10 and the downstream motor, not shown, for the transverse sealing jaws. At the upstream end of the operating path 7, the chains 15, 16 circulate around coaxial deflection wheels 24.

Pushers 27, 28 and steadies 29, 30 are secured to a portion of the circumference, preferably over about half the circumference, of each chain 15, 16. For each chain 15, 16, the pushers 27, 28 are uniformly spaced from one another corresponding to the interval 31 in the section in which the chains 15, 16 are equipped with pushers. The spacing 32 between the pusher 27, 28 and the associated steady 29, 30 is likewise constant. A sensor 37 for detecting the passage of each pusher 27, 28 and/or each steady 29, 30, which all circulate in the same vertical plane, is disposed near, but in front of, the initial station 36. The sensor 37 is also connected to the control device 23. In the initial station 36, the products 2 are pushed, for example with a plunger, transversely to the transport direction A onto the conveying device 1.

As can be seen from FIGS. 3 through 6, a pin 39, 40 projects horizontally outwardly from each link of the chains 15, 16, that is, toward the side facing away from the other chain 16, 15. Pushing bodies 41, 42 and the steadies 29, 30 having corresponding bores are inserted onto respectively two adjacent pins 39, 40. The pushers 27, 28 are seated on these bodies 41, 42 so as to pivot about transverse shafts 43, 44. A lever 45, 46 supporting a guide roller 47, 48 at its free end is rigidly connected to the shafts 43, 44 on the outside of the bodies 41, 42. The levers 45, 46 are spring-loaded, the spring not being shown, such that the rollers 47, 48 rest against guide tracks 49, 50, at least along the operating path 7. At the end of the operating path 7, the guide tracks 49, 50 have a countersink, not shown, so that the pushers 27, 28 pivot backward in the manner described in U.S. Pat. No. 4,068,756 and EP-B-399 948 so as not to accelerate the product 2 in the conveying direction A at the end station 6.

Through the rearrangement of the insertion of the pushers 41, 42 and/or the steadies 29, 30, the interval 31 and/or the spacing 32 is or are changed and adapted to the length of the products 2 or the desired transverse-sealing width and product thickness. Generally, the product of the interval 31 and the number of pushers 27, 28 does not correspond to the circumference of the chains 15, 16. Outside of the operating region 7, that is, in the lower run 53, 54 of the chains 15, 16, therefore, the front pusher 27, 28 of the one chain 15, 16 will have a spacing from the back pusher 28, 27 of the other chain 16, 15 that does not correspond to the interval 31. This is compensated before the front pusher 27, 28 or steady 29, 30 reaches the initial station 36, in which the relevant motor 21 or 22 is correspondingly accelerated and decelerated, or decelerated and accelerated, as controlled by the control device 23 with the signals of the sensor 37 and the rotation-angle setter 21, 22, such that all of the pushers 27, 28 always have a constant spacing from one another corresponding to the interval 31 along the operating path 7.

The device of the invention possesses a much simpler design than the devices mentioned at the outset, because it requires no additional loop of the transport chains 15, 16 and no setting of the position of the upstream deflection wheels 24. The device is very flexible, and can be adapted easily to other product spacings and lengths. Its simple design also allows it to operate reliably.

In the devices described at the outset, the products 2 are pushed along the operating path 7 on a slotted disk. The pushers 27, 28 and steadies 29, 30 extend through the slot of this disk. In the device of the invention, however, support elements 55 having support surfaces 56 are additionally inserted onto two pins 39, 40 on the chains 15, 16, between the pushers 27, 28 and the associated steadies 29, 30. The support elements 55 are interlaced like fingers in the region of the support surfaces 56 (FIGS. 5 and 6), so the spacings 32, which are a whole-number multiple of the support-element length, can also be bridged. These support elements effect very gentle handling of the products 2.

Toothed belts, for example, are also suitable as conveying elements instead of the chains 15, 16.

In a modification of the illustrated embodiment, two separate sensors 37 can also be provided for the two chains 15, 16, with the one sensor 37 only detecting the pushers 27 and/or steadies 29 of the one chain 15, and the other sensor 37 only detecting those of the other chain 16. To this end, the sensors 37 can detect projections 57, 58, for example, on the support elements 55 or carriers 59 of the steadies 29 as they pass through, inductively or using light optics, for example. For synchronizing the motors 21, 22 with the motor 10, the latter can additionally include an incremental rotation-angle setter 11, which is connected to the control device 23.

As can be seen from FIGS. 1 and 2, the front element of the group of pushers 27, 28 and steadies 29, 30 of a chain 15, 16 can be either a pusher 27, 28 or a steady 29, 30. With this arrangement, the interval deviations to be compensated can be kept small. The maximum interval deviation to be compensated corresponds to less than half of the interval. To attain gentle handling, the accelerations and decelerations required for interval compensation are minimized.

What is claimed is:

1. A feed device for a packaging machine, comprising: a loading station and an unloading station joined together by an operating path; two drive motors; two rotational angle sensors; a control device; and two conveying elements; wherein the conveying elements circulate adjacent to one another at least along the operating path between the loading station and the unloading station; the drive motors separately driving the conveying elements; each of the drive motors is connected to the respective rotation angle sensor; the motors and the sensors being connected to the control device, wherein each conveying element comprises: a group of a plurality of pushers; said pushers being spaced with a uniform, settable interval within said group; wherein the plurality of pushers extends over only a portion of the length of the respective conveying element; said group comprising a front pusher and a back pusher; and wherein the control device controls the drive motors such that the front pusher of the one conveying element, in the region of the loading station, follows the back pusher of the other conveying element with a spacing corresponding to the interval.

2. A feed device according to claim 1, wherein the pushers of the two conveying elements are disposed in virtually the same plane.

3. A feed device according to claim 1, wherein each conveying element has at least three pushers.

4. A feed device according to claim 1, wherein the rpm of the one drive motor is uniform, provided that at least one of the pushers of the conveying element that is driven with this drive motor is disposed in the region of the operating path, and that this drive motor drives non-uniformly when the front pusher approaches to region of the loading station.

5. A feed device according to claim 1, wherein the conveying elements are respectively diverted on at least one side around a deflecting wheel, and the two deflecting wheels are coaxial and are connected to the drive motors.

6. A feed device according to claims 1, wherein the drive motors are servo motors.

7. A feed device according to claim 1, wherein a position sensor for the pushers is disposed near, but in front of, the initial station, in the region of the circulating path of the pushers, the position detector being connected to the control device, which controls the drive motors.

8. A feed device according to claim 1, wherein the conveying elements additionally have inserted support elements having a support surface for supporting the products to be conveyed.

9. A feed device according to claim 1, wherein the conveying elements are chains, and the pushers are secured to pusher bodies inserted onto pins that project transversely from the chains.

10. A feed device according to claim 9, wherein the pushers are seated on the pusher bodies so as to pivot about transverse shafts.

* * * * *